Figure 1:
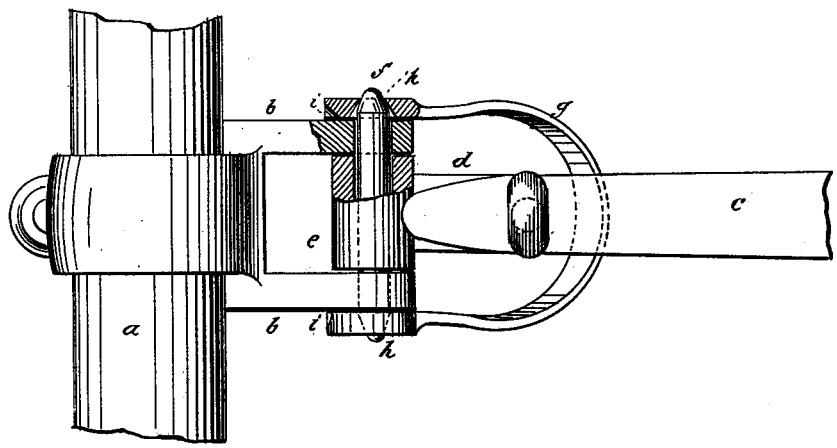
Figure 2:
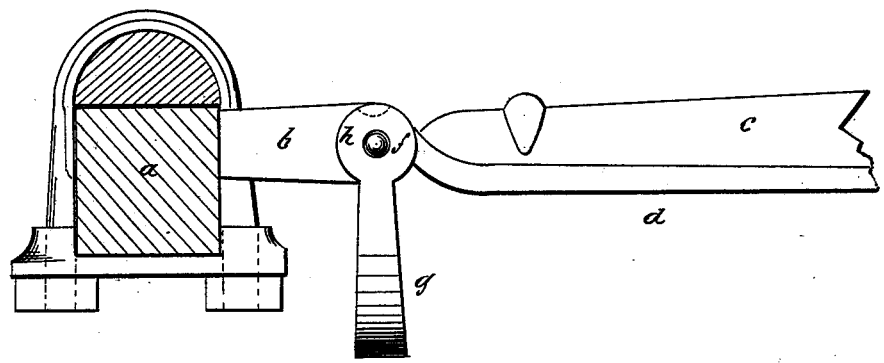

W. S. PALMER.
Thill-Coupling.

No. 206,965. Patented Aug. 13, 1878.

WITNESSES:

INVENTOR:
W. S. Palmer
BY
ATTORNEYS.

UNITED STATES PATENT OFFICE.

WINFIELD S. PALMER, OF GLENBURN, PENNSYLVANIA.

IMPROVEMENT IN THILL-COUPLINGS.

Specification forming part of Letters Patent No. 206,965, dated August 13, 1878; application filed July 10, 1878.

*To all whom it may concern:*

Be it known that I, WINFIELD S. PALMER, of Glenburn, in the county of Luzerne and State of Pennsylvania, have invented a new and Improved Thill-Coupling, of which the following is a specification:

The object of my invention is to dispense with the burr or nut usually employed to secure the thill-iron of carriage-shafts to the clips or ears, and to furnish a coupling which may be applied to the ordinary thill-iron and clips without requiring alterations. The couplings that are secured by a nut are unreliable in consequence of the nut becoming loose upon its thread.

The invention will first be described in connection with the drawing, and then pointed out in the claim.

$a$ is the axle-tree of a carriage or wagon, with the clips $b$ attached, as usual. $c$ is the shaft, and $d$ the thill-iron at the end thereof. The thill-iron $d$ is formed with an eye, $e$, which passes between the clips $b$; and $f$ is a pin passing through the clips $b$ and eye $e$ to connect them together. The ends of the pin $f$ are pointed, and project a short distance outside of the clips $b$.

$g$ is a U-shaped spring-shackle, which is provided with a hole, $h$, near each end, to take upon the pointed ends of the pin $f$ where they project outside of the clips or ears $b$, and at the inside of the shackle the holes $h$ are countersunk or formed tapering, to conform to the pointed end of the pin.

The shackle $g$ is made of spring-steel, and is bent to such a size that it has to be sprung slightly apart to force it upon the pin, and when in place there is a constant pressure inward by the ends of the shackle, which pressure retains the shackle in place and prevents the pin coming out.

To remove the shackle for separating the thill-iron $d$ from the clips $b$, the shackle has only to be sprung apart to separate one end from the pin $f$.

I provide a tapering slot, $i$, at each end of the shackle $g$, into which a sharp-pointed instrument may be inserted to aid in releasing the shackle. These slots $i$ are also used in connecting the shackle by placing the slots upon the ends of the pin $f$ and pressing on the back of the shackle, which will cause the shackle to spread and spring to place.

The shackle $g$ cannot get off or out of place, and it will be seen that this coupling may readily be attached to the ordinary thills, the pin $f$ simply being substituted for the usual screw-bolt.

I do not limit myself to the shape of the spring-shackle, or to the manner of connecting the same upon the ends of the pin, as those details may be varied without departing from my invention.

The shackle is a most convenient form for obtaining a spring-pressure in opposite directions upon the ends of the pin.

I am aware that it is not new, broadly, to use a spring-shackle upon the clips and a bearing upon the opposite ends of the pin; but heretofore the pin has been made with a head at one end and an annular groove at the other, the said devices allowing the bolt to work loose and rattle. On the other hand, mine is not only much less expensive, but takes up the wear as it occurs, and avoids all possibility of rattling. Hence

What I claim to be new and of my invention is—

The combination, in a thill-coup the ears $b\ b$, of the pin $f$, beveled at each end, and the spring-shackle $g$, having the inside countersinks $h$, as shown and described, for the purpose specified.

WINFIELD SCOTT PALMER.

Witnesses:
   J. C. REYNOLDS,
   THOS. WHAITE.